United States Patent
Lamoureux

[11] Patent Number: 5,251,735
[45] Date of Patent: Oct. 12, 1993

[54] ELECTROMAGNETIC WRAP SPRING CLUTCH

[75] Inventor: George Lamoureux, Rockford, Ill.
[73] Assignee: Dynacorp, Inc., Rockford, Ill.
[21] Appl. No.: 978,817
[22] Filed: Nov. 19, 1992
[51] Int. Cl.⁵ .................................... F16D 27/105
[52] U.S. Cl. .................................... 192/84 T; 192/35; 192/81 C
[58] Field of Search .................... 192/84 T, 81 C, 35, 192/12 BA, 84 C; 335/281

[56] References Cited

U.S. PATENT DOCUMENTS

| | | | |
|---|---|---|---|
| 3,149,706 | 9/1964 | Mason et al. | 192/84 C X |
| 3,185,276 | 5/1965 | Sajovec. | |
| 3,637,056 | 1/1972 | Baer | 192/12 BA |
| 3,934,690 | 1/1976 | Janning | 192/84 T |
| 4,321,992 | 3/1982 | Gallo | 192/81 C |
| 4,502,578 | 3/1985 | Koyama | 192/26 |
| 4,846,324 | 7/1989 | Osawa | 192/35 |
| 5,024,311 | 6/1991 | Osawa | 192/84 T |
| 5,090,538 | 2/1992 | Osawa | 192/84 T |

Primary Examiner—Richard M. Lorence
Attorney, Agent, or Firm—Niro, Scavone, Haller & Niro

[57] ABSTRACT

An electromagnetic wrap spring clutch having a field assembly made from a single L-shaped bracket is disclosed. This L-shaped bracket design improves upon previously known round body or bracket and yoke designs.

7 Claims, 4 Drawing Sheets

Fig. 1A
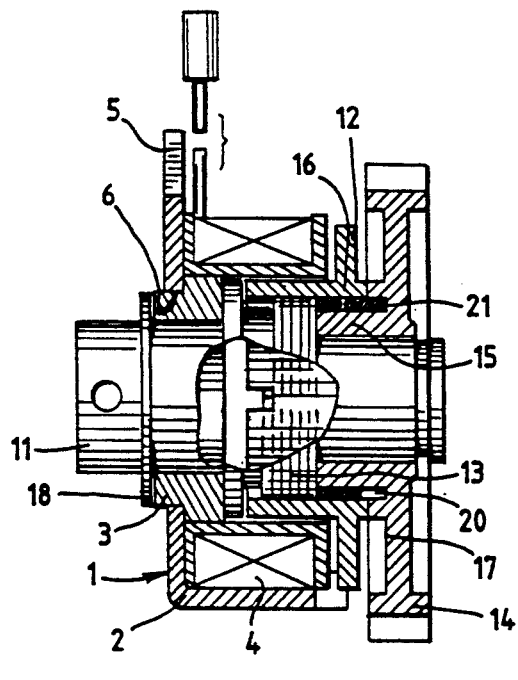
Fig. 1B
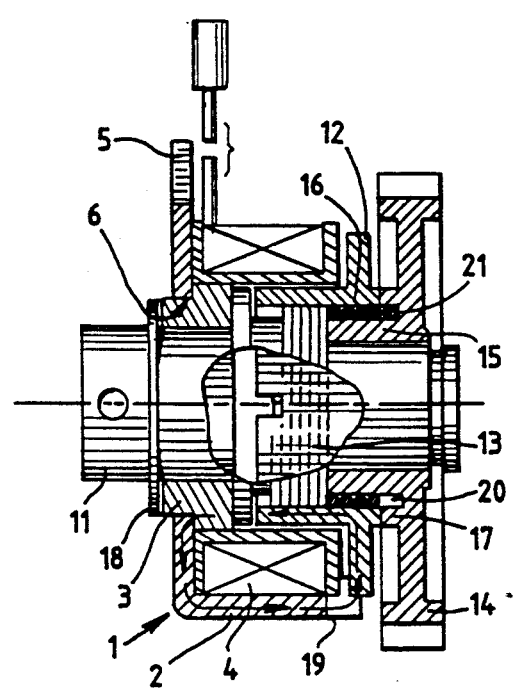
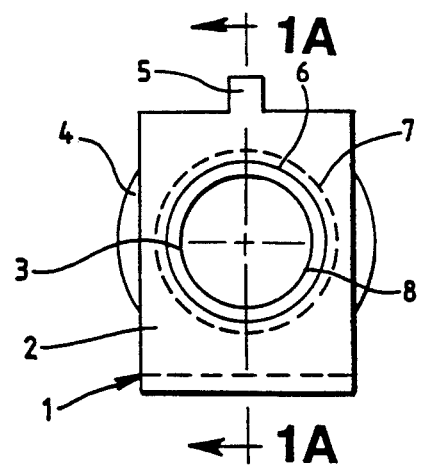
Fig. 2

ELECTROMAGNETIC WRAP SPRING CLUTCH

BACKGROUND OF THE INVENTION

This invention relates generally to an electromagnetic wrap spring clutch. More particularly, the present invention relates to an electromagnetic wrap spring clutch wherein a clutch body assembly is housed within a field assembly having a unique bracket design.

Electromagnetic wrap spring clutches are well known. Such a clutch is disclosed in Gallo, U.S. Pat. No. 4,321,992, which is incorporated herein by reference. However, the clutch disclosed in Gallo has the disadvantage that its field assembly is formed as a round body, which results in material waste and long processing time during its manufacture.

This disadvantage was overcome in part by Ohsawa, U.S. Pat. No. 4,846,324. Ohsawa teaches that the round body field assembly may be replaced by a field assembly formed by two separate pieces: a bracket and a yoke. In another prior art clutch disclosed in Ohsawa U.S. Pat. No. 5,024,311, a U-shaped bracket for supporting the clutch assembly is provided. The shaft of the clutch is inserted through two facing walls in the bracket. However, due to the configuration, the resulting magnetic circuit is inefficient causing inferior performance. It would, therefore, be desirable to have a clutch with a field assembly made from a single-piece or unitary bracket which is more efficient than prior clutch assemblies to enhance overall clutch performance.

SUMMARY OF THE INVENTION

The present invention preserves the advantage of known electromagnetic wrap spring clutches. In addition, it provides new advantages not found in currently available clutches and overcomes many of the disadvantages associated with known equipment.

The electromagnetic wrap spring clutch of the present invention includes a field and a clutch body assembly. The field assembly includes a L-shaped bracket which has a hole for receiving the clutch body assembly. The field assembly disposed around a clutch body assembly includes a wire coil wound around a bobbin. The clutch body assembly includes an input hub, an output shaft, a wrap spring, and a flanged armature with a flange that is coplanar with the bracket flange. The flanged armature rotates about a wrap spring which is connected to the input hub. As a result, rotational forces are transmitted from the input hub to the output shaft when current is passed through the wire coil.

Accordingly, it is an object of this invention to provide an electromagnetic wrap spring clutch having a field assembly that is less complex than those in previously known clutches.

It is another object of this invention to provide an electromagnetic wrap spring clutch that is less expensive to manufacture than previously known clutches.

It is yet another object of this invention to provide an electromagnetic wrap spring clutch having a field assembly having a simple bracket design which is capable of performing the same function of more complex field assemblies with improved performance.

It is still yet another object of this invention to provide an electromagnetic wrap spring clutch wherein additional windings of wire coil may be added without changing the size of the supporting field bracket.

Yet still another object of this invention is to provide an electromagnetic wrap spring clutch wherein the size of the wire coil may be expanded beyond the size of the field bracket supporting it.

BRIEF DESCRIPTION OF THE DRAWINGS

The novel features of the invention are set forth in the appended claims. The invention itself, however, together with further objects and attendant advantages, will be best understood by reference to the following description taken in connection with the accompanying drawings in which:

FIG. 1A is a cross-sectional view through the lines 2—2 of FIG. 2;

FIG. 1B is a cross-sectional view as in FIG. 1A with magnetic flux circuit shown;

FIG. 2 is a side view of the field assembly of the present invention;

DETAILED DESCRIPTION OF THE PREFERRED EMBODIMENT

Figure 3:
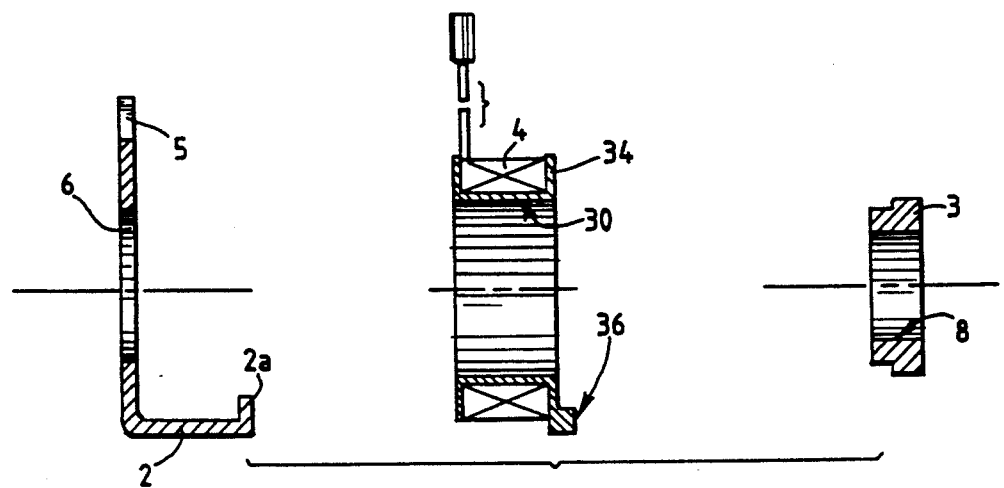
FIG. 3 is an exploded cross-sectional view of the field assembly of the present invention.
Figure 6:
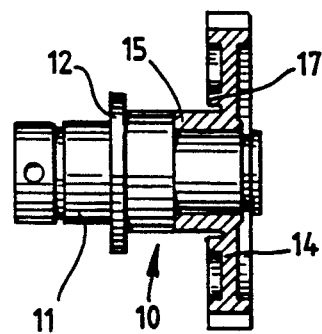
FIG. 6 is a partial cross-sectional view of the clutch body assembly of the present invention.

Turning first to FIGS. 1A, and 2, the electromagnetic wrap spring clutch of the present invention includes a field assembly 1. A clutch body assembly 10, included in the device is shown in FIGS. 1A, 1B and FIG. 6. The field assembly 1 is comprised of an L-shaped bracket 2 which is open on four sides, a field bushing 3, and a wire coil 4. As shown in FIG. 3, hole 6 is stamped or otherwise formed in the center of the leg of the L-bracket 2. Bracket 2 has a tab 5 which acts to prevent the field assembly 1 from rotating during operation.

FIG. 3 shows the field bushing 3, which fits into hole 6. The left side of field bushing 3 (as shown in FIG. 3) has an outer diameter equal to the diameter of hole 6 in bracket 2. The right side of field bushing 3 has an outer diameter equal to the diameter of hole 30 of coil 4. Field bushing 3 has a hole 8 which is axially aligned with hole 6.

Figure 4A:
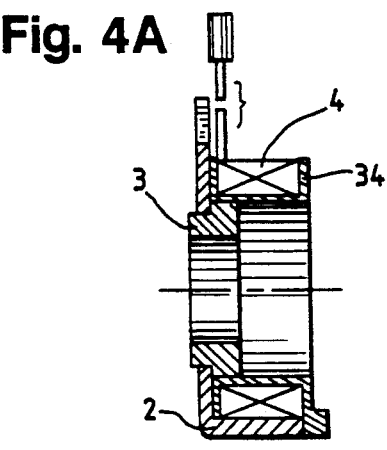
FIG. 4A is a cross-sectional view of the preferred embodiment of the field assembly in the present invention.

Field bushing 3, shown inside bracket 2 in FIG. 2 and in cross-section in FIG. 4A, holds wire coil 4 in bracket 2. Field bushing 3 also acts as a bushing for output shaft 11 shown in FIG. 1.

Referring to FIGS. 3 and 4, coil 4 is wound about bobbin 34 which includes a tab 36 for keying with slot 32 of the L-bracket 2. Slot 32 is present in bracket flange 2a of L-bracket 2. The keying of the coil 4 via bobbin 34 to L-bracket 2 prevents unwanted rotation and slippage during operation.

Figure 4B:
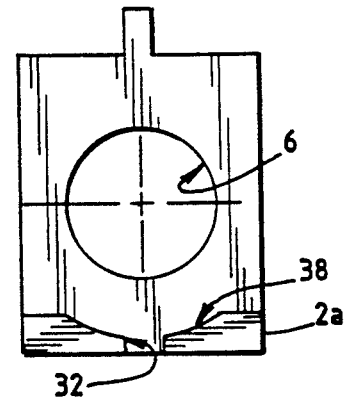
FIG. 4B is a front view of the bracket of the field assembly.
Figure 5A:
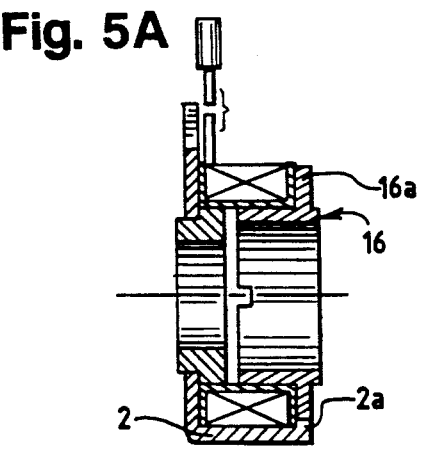
FIG. 5A is an assembly of FIG. 4A cross sectional view of the field assembly of the present invention with flanged armature in place.
Figure 5B:
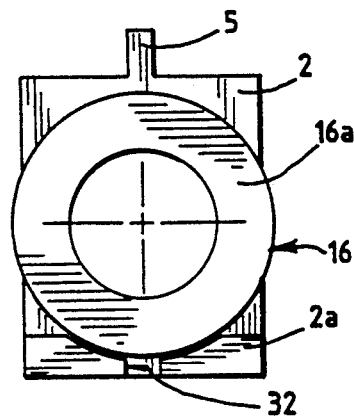
FIG. 5B is a front view of the bracket of the field assembly of the present invention with flanged armature in place.

As shown in FIG. 4B, bracket flange 2a has an arcuate upper surface 38 of slightly larger radius to provide a complimentary rotation mating at the circular flange 16a of flanged armature 16 as shown in FIGS. 5A and 5B. Without the complete clutch assembly installed, the flanged armature 16 is disposed inside coil 4 to illustrate the positioning of the armature flange 16a in relation to bracket flange 2a. It is not required that these flanges touch one another during operation. However, if these two flanges do not touch one another, they but must be close enough to one another to maintain the flux circuit shown in FIG. 1B yet far enough from one another to permit flanged armature 16 to freely turn.

Figure 7:
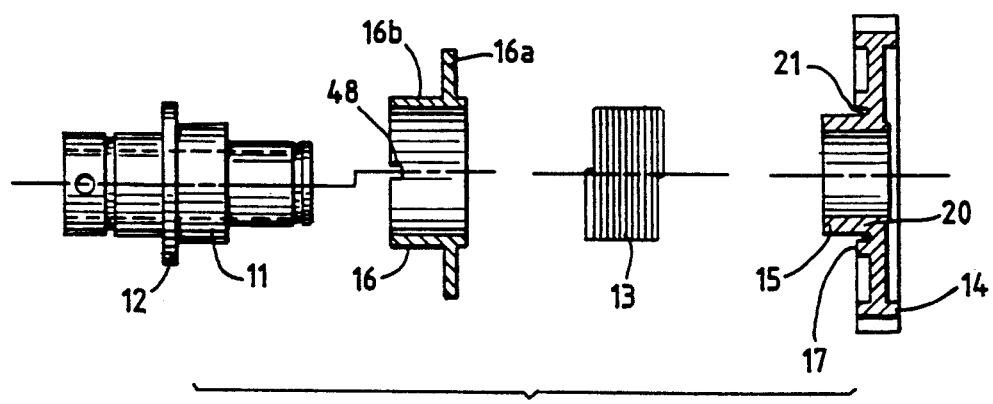
FIG. 7 is an exploded side view of the clutch body assembly of the present invention.

As shown in FIG. 6 (assembled form) and FIG. 7 (exploded form with flanged armature 16 and wrap spring 13), clutch body assembly 10 is comprised of output shaft 11, flange 12, wrap spring 13, input hub 14, and an armature in the form of a flanged cylindrical sleeve 16 with radial flange 16a. Flange 12 has a circular periphery and surrounds output shaft 11. Flange 12 is assembled to output shaft 11 in fixed position or, in the alternative, flange 12 and output shaft 11 may be formed as one piece. Those of ordinary skill in the art will appreciate that the hub 14 may be the output, as well as the input, to the clutch. Likewise, the shaft 11 may be the output or input to the clutch. Input hubs 14 of varying sizes, shapes and configurations may be employed in accordance with the desired use of the invention.

Figure 8:
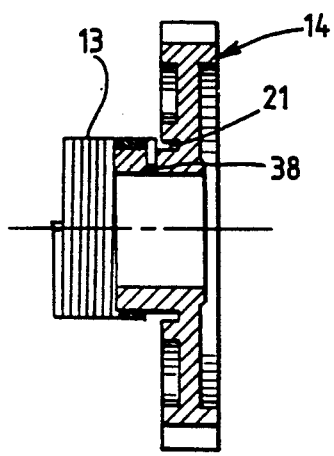
FIG. 8 is a side view of an input hub with wrap spring of the clutch body assembly.
Figure 9:
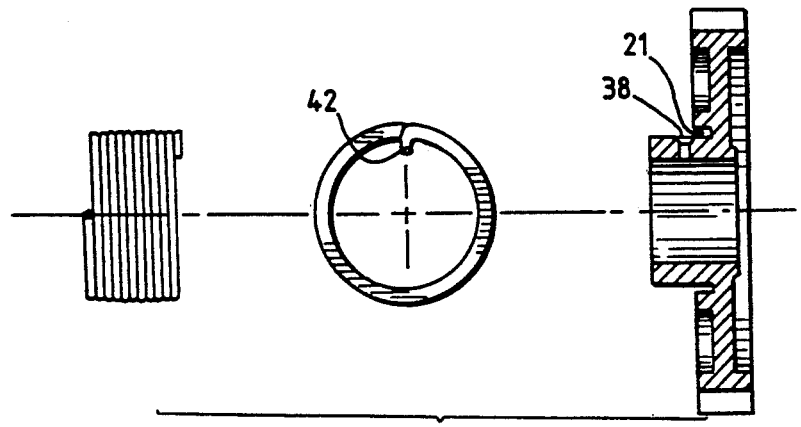
FIG. 9 is an exploded side view of the input hub and wrap spring of FIG. 8.

In one preferred embodiment of the present invention, input hub 14 has a circular ridge 17 which surrounds central boss 15, thereby defining an annular recess 20. Wrap spring 13 fits over central boss 15 and may be pressed in place into annular recess 20 with a press fit relationship to boss 15. Alternatively, input hub 14 may further include a small abutment or protuberance 21 which extends into recess 20 and which engages the end of wrap spring 13 to transmit forces from the hub to the spring and to prevent rotation of the spring on the hub 14. The engagement of the wrap spring 13 and input hub 14 is isolated as shown in FIG. 8. An exploded view of this engagement is shown in FIG. 9. As an alternative method for attaching the spring to the input hub 14, a crosshole 38 is provided in the neck of hub 14. An inwardly turned spring end 42 fits into crosshole 38 to prevent axial movement of wrap spring 13 on input hub 14.

Figure 10:
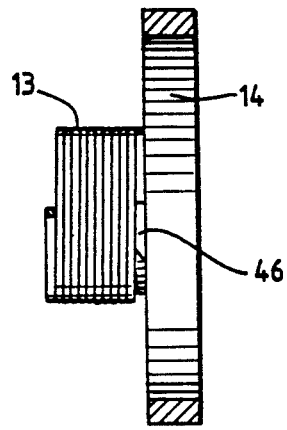
FIG. 10 is a side view of an alternative embodiment of present invention with input hub and wrap spring shown.
Figure 11:
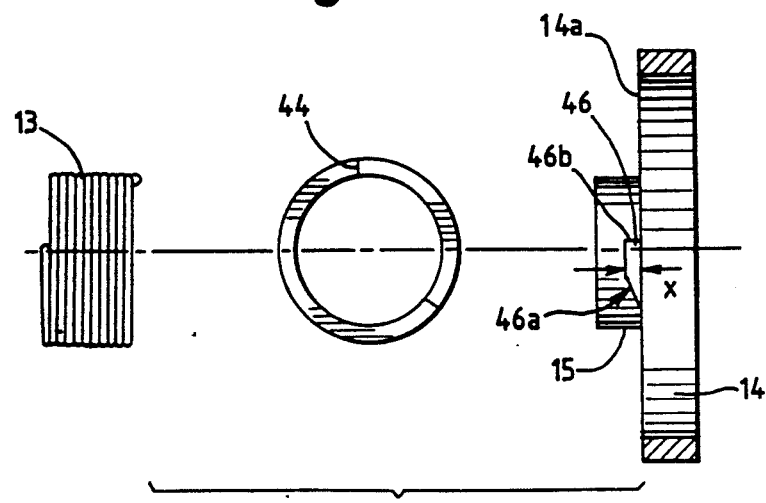
FIG. 11 is an exploded side of view of the input hub and wrap spring of FIG. 10.

A further alternative means for preventing axial movement of wrap spring 13 on input hub 14 is shown in FIGS. 10 and 11. Wrap spring 13 terminates at point 44 without an inwardly turned end as in the embodiment of FIGS. 8 and 9. A stop 46 is present on central boss 15 and in contact with input hub 14. The height X of stop 46 is approximately equal to the diameter of a single coil of spring 13 so that spring 13 may sit flush against wall 14a of input hub 14. End 44 of spring abuts against surface 46b when installed and will prevent clockwise rotation about axial boss 14. Slanted surface 46a of stop 46 permits counter-clockwise rotation of spring 13. During operation, spring 13 will be turned clockwise and then effectively engaged with input hub 14 via stop 46.

Referring back to FIG. 7, the flanged cylindrical armature 16 fits over wrap spring 13 and is connected to wrap spring 13 in the end opposite input hub 14. The connection is made in a conventional manner by bending the end or wrap spring 13 outward to engage a slot 48 in the rim of the armature portion of flanged armature 16b located opposite input hub 14. The periphery of hub 14 is provided with gear-teeth or other components or materials capable of cooperating with motion transmission devices. Wrap spring 13 fits over central boss 15 of input hub 14. Output shaft 11 is assembled through wrap spring 13 and input hub 14.

During normal operation and with no power applied to the clutch, input hub 14 is rotating while output shaft 11 is stationary. When power is applied to wire coil 4, a magnetic path 19, as shown in FIG. 1B, is formed causing armature 16, which is rotating with input hub 14, to magnetically attach to flange 12 on output shaft 11, causing armature 16 to rub against flange 12. This frictional force slows the rotation of armature 16, causing it to axially rotate with respect to input hub 14, which had heretofore been in fixed rotation with armature 16. This relative rotation causes wrap spring 13 to "wrap" down on output shaft 11, thus forcing output shaft 11 to move in fixed rotation with input hub 14.

When the applied power to wire coil 4 is withdrawn, the magnetic attraction between flange 12 and armature 16 ceases, thus reducing the frictional drag between flange 12 and armature 16. The elimination of this drag allows wrap spring 13 to return to its original shape, thus "unwrapping" and releasing output shaft 11. Thus, output shaft 11 ceases its rotation.

The present invention is significantly less expensive to manufacture than previously known clutches because of the simplicity of the L-shaped field bracket 2 design. This field bracket is less expensive to manufacture because it requires only one piece of metal, rather than the two or more pieces required by conventional designs.

Another advantage of the present invention is that unlike previously known designs, the field bracket does not completely enclose the wire coil. The wire coil may have a diameter greater than the width of the L-shaped field bracket. Thus, the present invention makes possible the use of larger wire coils than have been previously allowable for similarly sized field brackets, thereby increasing the clutch's operating forces.

It should be noted that the magnetic path 19, exists only at the bight of bracket 2 which is normal to the leg and base of L-bracket 2 and through the flange of armature 16 (the other four sides being open). Thus, this asymmetric magnetic force is less than the potential force which could otherwise be applied if two or more sides were closed. Nevertheless, this asymmetric magnetic force is sufficient to accomplish the goal of wrapping the wrap spring 13 down on output shaft 11, thus imparting the rotation of the input hub 14 to output shaft 11.

The L-bracket design of the present invention is superior to previous electromagnetic wrap spring clutches because it has an improved magnetic circuit. Since the flanged armature is circular in shape with a tight radial clearance to the bracket flange, magnetics are concentrated and not wasted as would occur if the flanged armature were square or rectangular in shape. Further, the magnetic circuit is improved because the flange 16a and the armature portion 16b are preferably integrally formed as opposed to separated as in prior art arrangements where an armature is disposed next to a wall.

Inferior magnetics result in these prior art devices. The present invention overcomes these problems by providing a rotating flanged armature to greatly improve magnetics which, in turn, enhances overall electromagnetic wrap spring clutch performance.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An electromagnetic wrap spring clutch comprising:
   a field assembly and a clutch body assembly;
   said field assembly including a generally rigid L-shaped bracket of a predetermined width having a first wall with an upper edge and a lower edge and a second wall having a proximal edge and distal edge, said first wall and said second wall being connected at respective lower and promixal edges with said first and second walls being substantially perpendicular to one another, said first wall having a hole for receipt of said clutch body assembly therein on an axis generally normal to the plane of said first wall, said field assembly further including a wire coil disposed concentric with said axis; and
   said clutch body assembly including an input hub, an output shaft, a cylindrical armature having an armature flange being rotationally matable and coplanar with a bracket flange on the distal end of said second wall, and a wrap spring means for connecting said armature with said input hub and for transmitting rotational forces from said input hub to said output shaft when current is passed through said wire coil.

2. The electromagnetic wrap spring clutch of claim 1 further including a field assembly bushing retainably supporting said output shaft and said wire coil within said bracket.

3. The electromagnetic wrap spring clutch of claim 1 wherein said wire coil has a diameter greater than the width of said L-shaped bracket.

4. The electromagnetic wrap spring clutch of claim 1, wherein said input hub includes a central boss with a receptacle therein adapted to receive said wrap spring means to prevent rotation of said wrap spring means relative to said input hub.

5. The electromagnetic wrap spring clutch of claim 1 wherein said input hub includes a central boss and a circular ridge separated by an annular recess adapted to receive said wrap spring means, and an abutment member extending into said recess for transmitting forces from said input hub to said wrap spring means to prevent rotation of said wrap spring means relative to said input hub.

6. The electromagnetic wrap spring clutch of claim 1, wherein said input hub includes a central boss, a circular ridge and an elevated stop member on the neck of said hub to prevent radial rotation of said wrap spring means relative to said input hub.

7. The electromagnetic wrap spring clutch of claim 1, wherein said wire coil is wound about a bobbin which includes a projection for engagement with a notch disposed in the bracket flange of said second wall.

* * * * *